US00RE48089E

(19) United States
(12) Reissued Patent
Jorguseski et al.

(10) Patent Number: US RE48,089 E
(45) Date of Reissued Patent: Jul. 7, 2020

(54) METHOD AND SYSTEM FOR AUTOMATIC COVERAGE ASSESSMENT FOR COOPERATING WIRELESS ACCESS NETWORKS

(71) Applicants: Koninklijke KPN N.V., Rotterdam (NL); Nederlandse Organisatie voor Toegepast-Natuurwetenschappelijk Onderzoek TNO, The Hague (NL)

(72) Inventors: Ljupco Jorguseski, Rijswijk (NL); Remco Litjens, Voorschoten (NL); Haibin Zhang, The Hague (NL); Adrian Victor Pais, Rijswijk (NL)

(73) Assignee: Koninklijke KPN N.V., Rotterdam (NL)

(21) Appl. No.: 16/224,047

(22) Filed: Dec. 18, 2018

Related U.S. Patent Documents

Reissue of:
(64) Patent No.: 8,626,175
Issued: Jan. 7, 2014
Appl. No.: 13/516,905
PCT Filed: Dec. 16, 2010
PCT No.: PCT/EP2010/069908
§ 371 (c)(1),
(2) Date: Jun. 18, 2012
PCT Pub. No.: WO2011/080096
PCT Pub. Date: Jul. 7, 2011

(30) Foreign Application Priority Data

Dec. 21, 2009 (EP) ..... 09180130

(51) Int. Cl.
*H04W 40/00* (2009.01)
*H04W 16/18* (2009.01)
*H04W 24/06* (2009.01)

(52) U.S. Cl.
CPC ..... *H04W 16/18* (2013.01); *H04W 24/06* (2013.01)

(58) Field of Classification Search
CPC ..... H04W 16/18; H04W 24/06
See application file for complete search history.

(56) References Cited

U.S. PATENT DOCUMENTS 7,949,346 B2 * 5/2011 Capuzzello ..... H04W 64/00 455/456.1
8,301,162 B2 * 10/2012 Ward ..... 455/456.1
(Continued)

FOREIGN PATENT DOCUMENTS

EP 2076093 A1 * 7/2009 ..... H04W 24/10
EP 2976993 A1 7/2009
(Continued)

OTHER PUBLICATIONS

3GPP TSG RAN WG2 #72, R2-106442, Jacksonville, FL, USA, Nov. 15-19, 2010, Method for ANR support in UTRAN.
(Continued)

*Primary Examiner* — Angela M Lie
(74) *Attorney, Agent, or Firm* — McDonnell Boehnen Hulbert & Berghoff LLP

(57) ABSTRACT

The invention relates a method and system for assessing coverage of a wireless access network within a desired area via cooperating wireless access networks and terminals capable of measurement and reporting across the different wireless access networks. The cooperation refers to, among other things, the ability of obtaining coverage assessment for one of the wireless access networks using results of the measurements collected at one of the other wireless access networks. In this manner, more accurate and complete coverage assessment may be obtained, relative to the prior art approaches.

15 Claims, 4 Drawing Sheets

(56) References Cited

U.S. PATENT DOCUMENTS

| | | | | |
|---|---|---|---|---|
| 8,514,776 | B2 * | 8/2013 | Robinson | H04L 41/147 370/328 |
| 9,113,362 | B2 * | 8/2015 | Zhang | H04W 24/08 |
| 2004/0002328 | A1 | 1/2004 | Chandra et al. | H04W 8/18 455/422.1 |
| 2007/0004394 | A1 | 1/2007 | Chu et al. | |
| 2008/0051129 | A1 * | 2/2008 | Abe et al. | 455/550.1 |

FOREIGN PATENT DOCUMENTS

| | | | | |
|---|---|---|---|---|
| WO | WO1997/31502 | | 8/1997 | |
| WO | WO-9731502 | A1 * | 8/1997 | H04W 36/30 |
| WO | WO2009093960 | A1 | 7/2009 | |

OTHER PUBLICATIONS

3GPP TSG-RAN2#67bis, R2-095954, Miyazaki, Japan, Oct. 12-16, 2009, Common pilot measurements for MDT.

PCT International Search Report and Written Opinion, PCT International Application No. PCT/EP2010/069908 dated May 13, 2011.

European Search Report, European Patent Application No. 09180130.8 dated Aug. 9, 2010.

"3rd Generation Partnership Project: Technical Specification Group Radio Access Network; Stage 2 Functional Specification of Location Services in UTRAN", 3G TS 25.305 V2.0.0., Dec. 1999, pp. 1-38.

* cited by examiner

METHOD AND SYSTEM FOR AUTOMATIC COVERAGE ASSESSMENT FOR COOPERATING WIRELESS ACCESS NETWORKS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

The present application is a national stage entry of PCT/EP2010/069908, filed Dec. 16, 2010, and claims priority to EP 09180130.8, filed Dec. 21, 2009. The full disclosures of EP 09180130.8 and PCT/EP2010/069908 are incorporated herein by reference.

FIELD OF THE INVENTION

The invention relates to the field of telecommunications infrastructures. More specifically, the invention relates to the field of coverage assessment in telecommunications infrastructures comprising wireless access networks.

BACKGROUND OF THE INVENTION

Wireless access networks are used to provide terrestrial coverage via placement of base stations throughout the desired coverage area. In order to provide adequate service to the clients, wireless operators constantly evaluate the coverage area of their wireless access networks. Such an evaluation may, for example, be done in the planning phase via coverage calculations based on models for the attenuation of the radio signals, terrain configuration data and the configuration data about the type and placement of the base stations. Such calculations provide, for the area under consideration and for each base station included in the calculations, a reasonably complete indication of the estimated signal strength but only with a limited accuracy, given the necessary simplifications made in the attenuation model and the limited degree of details in the underlying data bases. In their operational processes, wireless operators frequently use drive tests in order to assess the coverage of their wireless access networks. These drive tests consist of measurement routes that are traversed by a measurement terminal often mounted on a vehicle, as illustrated in FIG. 1, where the measurement route is shown with a line 1 and the measurement terminal (vehicle) location is shown as a dot 10. Such measurements provide, for each base station included in the measurement, a reasonably accurate indication of the signal strength but only for the very limited set of locations along the measurement route 1. Besides the drive measurements the operators collect statistical information from the network nodes about events that can be used to roughly indicate coverage problems such as failed connections, inter-radio access technology (inter-RAT) handovers and cell reselections, etc.

The coverage assessment options presented above have a number of drawbacks. One is that the planning process is generally characterised by a certain degree of inaccuracy due to e.g. estimation errors in the radio propagation modelling and/or inaccurate terrain configuration data. Another drawback is that the drive tests provide the coverage assessment only along the measurement route. Moreover, drive tests are too costly for estimation of the overall coverage. Yet another drawback is that the network statistics collection has its basic limitation in that only the signals and events for the terminals that are connected to/camping on the network may be reported (and not the terminals that do not have coverage). Moreover, such statistics can only roughly indicate the locations of coverage gaps.

As the foregoing illustrates, there exists a need in the art for a system and method for generating a coverage assessment in a telecommunications infrastructure in a manner that minimizes or eliminates at least some of the drawbacks of the current approaches described above.

SUMMARY OF THE INVENTION

An automatic coverage assessment system configured for generating a coverage assessment for a second wireless access network of a telecommunications infrastructure comprising a first wireless access network and the second wireless access network is disclosed. The first and second wireless access networks are capable of providing services to a plurality of terminals such as e.g. user terminals.

The system includes an information collector and a coverage estimator. In one embodiment, the information collector may be included within the first wireless access network, while the coverage estimator may be included within the second wireless access network. The information collector may be configured for collecting information from terminals via the first wireless access network. In another embodiment, the information collector and the coverage estimator may be included within the second wireless access network. In such an embodiment, the information collector may be configured for collecting information from terminals via the first and the second wireless access networks.

The coverage estimator may be configured for receiving information from the information collector. The information collector may be configured to select one or more terminals from at least part of the plurality of the terminals, where the at least part of the plurality of the terminals is capable of communicating with both the first wireless access network and the second wireless access network. The information collector may further be configured to obtain measurement information indicative of the signals measured from the second wireless access network by the selected one or more terminals and provide the measurement information to the coverage estimator. In one embodiment, the information collector may obtain the measurement information in response to an instruction provided to the selected one or more terminals to measure signals from the second wireless access network (suitable for generating the coverage assessment of the second wireless access network). The measurement information may e.g. include signal strength, cell identifications of the second wireless access network, information related to the location of the terminal (e.g. GPS coordinates), and/or information that can be used for location estimation (including e.g. signal strength indications, timing information, power information). The coverage estimator may be configured to obtain the measurement information from the information collector and, based on the obtained measurement information, generate the coverage assessment for the second wireless access network of the telecommunications infrastructure.

As used herein, the phrase "terminal capable of communication with both the first and second wireless access networks" is intended to cover not only wireless communication, but also include an indirect communication path (e.g. wirelessly to the first network and then via some fixed connection to the second network or via a third network to the second network). Furthermore, the communication with the first network could, but does not have to, take place at the same time as the communication with the second network.

Optionally, the automatic coverage assessment system may further include a first database connected to the information collector and configured for storing the measurement information and/or a second database connected to the coverage estimator and configured for storing the coverage assessment.

In various embodiments, the first and second access wireless access network respectively may for example include, respectively, a first network using a first radio access technology and a second network using a second radio access technology, a first network using a first radio spectrum and a second network using a second radio spectrum, a first network of a first network operator and a second network of a second network operator, or a first (sub) network and a second (sub)network of a same network operator.

In one embodiment, the telecommunications infrastructure may include at least one operations and maintenance centre, the first wireless access network may include a number of first base stations, and the second wireless access network may include a number of second base stations. In such an embodiment, at least a part of the automatic coverage assessment system may be contained in the operations and maintenance centre and/or the first and/or second base stations.

Based on the generated coverage assessment, the coverage estimator may further be configured to e.g. select geographical areas where installation of new base stations could be considered and/or identify existing base stations for which adjustments and/or extensions could be considered. Further, using the generated coverage assessment, the coverage estimator may be configured to generate one or more instructions based on a comparison of the coverage assessment with a previously generated coverage assessment.

A corresponding method, computer program, mobile user terminal, and network nodes that allow generating a coverage assessment for a second wireless access network of a telecommunications infrastructure as defined above are also disclosed.

The disclosed systems and a method are implemented based on the observation that an assessment of the coverage of a wireless access network within a desired area may be obtained via cooperating wireless access networks and terminals capable of measurement and reporting across the different wireless access networks. The cooperation refers to, among other things, the ability of generating coverage assessment for one of the wireless access networks using results of the measurements collected through one of the other wireless access networks. In this manner, more accurate and/or complete and/or less costly coverage assessment may be obtained, relative to the prior art approaches. Furthermore, the disclosed system and method may allow obtaining a coverage assessment for areas which are currently "out of coverage" by the prior art solutions.

One embodiment of the present invention provides a trigger configured for triggering the information collector to select the one or more terminals. The trigger may be included within the first wireless access network and may be event-based or periodical, with period T. In order to decrease or avoid collection of excessive location and/or measurement information, the trigger may be applied selectively depending on where and/or when the coverage assessment is needed.

Another embodiment allows avoiding excessive collection of information from terminals via the first wireless access network by obtaining location information for at least one of the at least part of the plurality of terminals prior to selecting the one or more terminals. The location information may be determined for terminals either in an idle mode (i.e. without an existing connection) or in an active mode (i.e. with an existing connection), as long as these terminals are capable of communicating with both the first and the second wireless access networks.

The location information may be obtained via location estimation techniques, which are known in the art, and/or via each of the at least part of the plurality of terminals providing their location information to the information collector (e.g. via terminals equipped with GPS receivers capable of determining their locations).

When the location information is obtained from the terminals, a radio resource control (RRC) channel may be used to convey the location information (as well as the measurement information) from the terminals to the information collector (possibly via the first wireless access network). A common data connection (e.g. via the wireless network that is currently serving the terminal) may also be used to convey information from the terminals to the information collector. In the remainder of the text, whenever an RRC channel is mentioned to convey information between two entities, it is implied that any other communication channel, such as e.g. a common data connection, may also be used.

Based on the location information, only terminals located in the area for which the coverage assessment should be generated may be selected for obtaining the measurement information.

Alternatively, the location information may be determined by the first wireless access network (e.g., by the information collector) up to the cell level or group of cells (e.g., location/routing/tracking area level) by selecting the at least part of the plurality of terminals to be terminals in a specified geographical area. For example, some or all terminals in a particular city area, a whole city, a district, a province/state, etc. may be selected to be the terminals from which then the one or more terminals are selected. This embodiment may be advantageous when location estimation techniques are not available, when exact location information of the terminals is not needed for selecting the terminals that should perform the measurements or when only coarse location information (e.g. cell-level location information) is sufficient.

One embodiment of the present invention specifies providing location information valid upon obtaining the measurement information for at least one of the selected one or more terminals.

Sometimes it may be possible that the location of the selected terminals when they are actually obtaining the measurement information is different from what it was when the location information was obtained by the first wireless access network. This could happen when the terminal moves during this (small) period. Therefore, such an embodiment allows updating the location information for at least one of the selected one or more terminals with the location information of the terminals at the time when the measurement information is obtained by the terminals. In case that the location information is provided by the terminal itself, the new location may be sent along with the measurement results. In case that the location is estimated by the first wireless access network, the network may re-estimate the location when it obtains the measurement results. If the new location is different from the old one, the new location may be used by updating the old location information.

Other times, location information or a location estimation may be provided after a terminal has been added to the set of measuring terminals (selected terminals). Therefore, such an embodiment also allows providing location information for at least one of the selected one or more terminals valid at the time of the measurement.

One embodiment sets forth associating the location information with at least one of the selected one or more terminals and providing the location information associated with the at least one of the selected one or more terminals to the coverage estimator. Such an embodiment advantageously allows providing the coverage estimator not only with the measurement information, but also with the location information associated with at least one of the selected one or more terminals, from which the coverage estimator may generate the coverage assessment (i.e., a representation of locations/pixels and e.g. associated signal strengths of the second wireless access network).

In one further embodiment, the information collector may be further configured to update the selected one or more terminals to eliminate terminals that are associated with the location information indicative of a location not included in a predefined location area for which the coverage assessment is generated, prior to forwarding the location information associated with the at least some of the selected one or more terminals to the coverage estimator. This embodiment may be particularly advantageous when e.g. one of the selected terminals moved during the period between obtaining the initial location information and actually performing the measurements as instructed by the information collector. If the new location of such a terminal is out of the area for which the coverage assessment should be generated, the new location and the corresponding measurement may be stored in a database for future use, but not used at the moment for the coverage assessment of the second wireless access network.

In one embodiment, the information collector may be configured to select the one or more terminals when the one or more terminals comprise terminals in a predefined location area for which the coverage assessment is generated. This specifies one criterion that may be advantageously applied in selecting the one or more terminals for obtaining the measurement information.

In other embodiments, the information collector may be configured to select the one or more user terminals when the one or more user terminals satisfy one or more of different criteria. For example, one criterion may be that the one or more user terminals use a predefined service via the first wireless access network while, according to operator policy, usage of the predefined service is preferred via the second wireless access network. Another criterion may be that a self-optimization or a manual optimization of a radio coverage is performed for one or more base stations within the second wireless access network and the one or more user terminals comprise user terminals in those cells within the first wireless access network that have inter-RAT neighbour relation with cells within the second wireless access network where the optimization takes place. Yet another criterion may be that the one or more user terminals comprise user terminals from one or more cells in the first wireless access network associated with a planned coverage overlap with one or more cells in the second wireless access network where the coverage should be assessed.

In various embodiments, an RRC signalling channel may be used to convey information between any of the terminals and the first and second wireless access networks.

Hereinafter, embodiments of the invention will be described in further detail. It should be appreciated, however, that these embodiments may not be construed as limiting the scope of protection for the present invention.

DETAILED DESCRIPTION OF THE DRAWINGS

Figure 1:
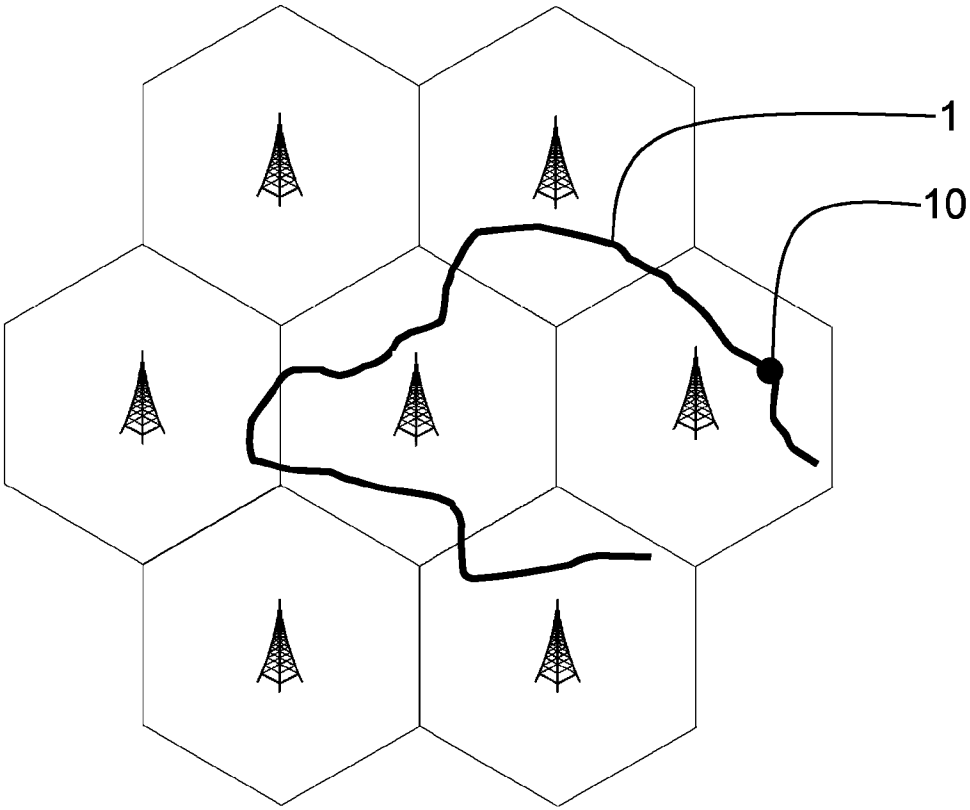
FIG. 1 provides a schematic illustration of a drive test measurement of the wireless access network coverage, according to prior art.
Figure 2:
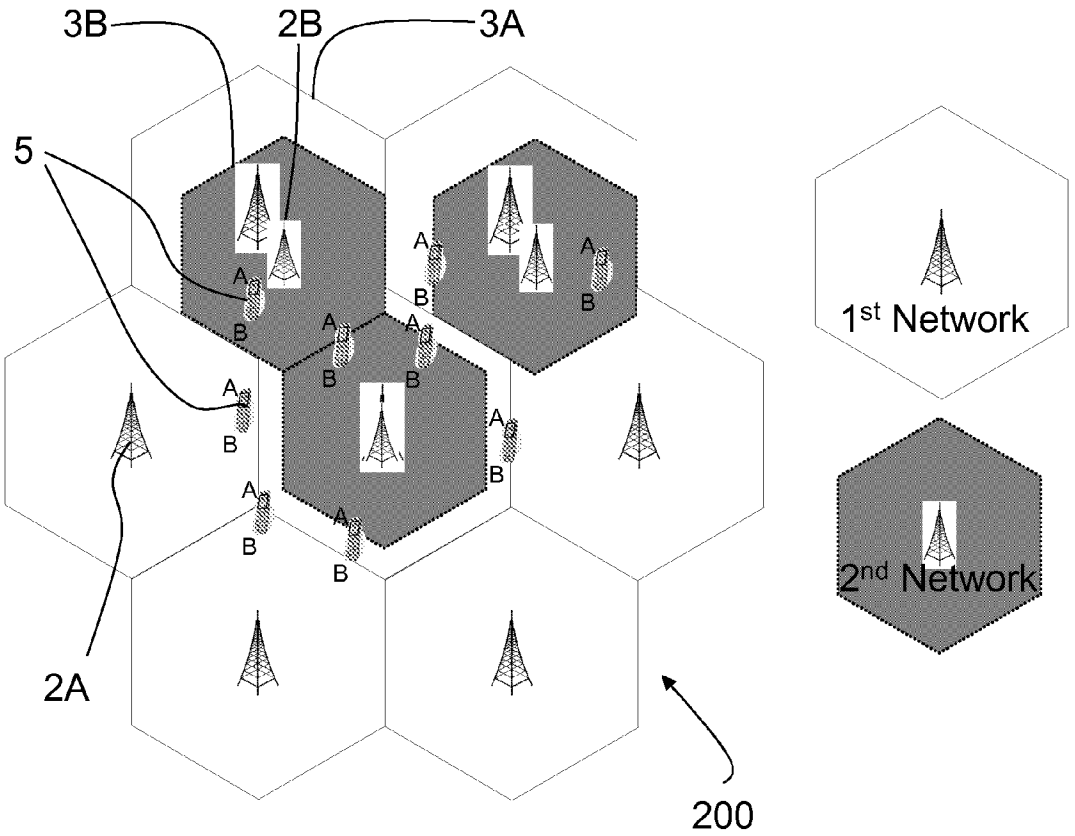
FIG. 2 provides a schematic illustration of a telecommunications infrastructure comprising two wireless access networks and terminals supporting both networks, according to one embodiment of the present invention.

FIG. 2 provides a schematic illustration of a telecommunications infrastructure 200, according to one embodiment of the present invention. The telecommunications infrastructure 200 comprises a first wireless access network and a second wireless access network, represented in FIG. 2 as networks 2A and 2B, respectively (including base stations, e.g. NodeBs in UMTS and/or eNodeBs in LTE) defining respective coverage areas 3A (solid lines) and 3B (dashed lines). It should be noted that the dimensions of the coverage areas 3A, 3B may not be constant in time.

A plurality of mobile terminals is associated with the first and second wireless access networks 2A, 2B. At least a part of these terminals can support multiple radio access systems (this part of the terminals is shown in FIG. 2 as terminals 5 which are capable of communicating with both the first and second wireless access networks 2A, 2B). The invention described herein is applicable in, but not limited to, areas where several wireless access networks are cooperating, for example, in terms of inter-RAT handover and/or cell reselection.

In one embodiment, the first and second wireless access networks 2A, 2B may be operated with a single operations and maintenance centre (OMC), not shown in FIG. 2. The first and second wireless access networks 2A, 2B may e.g. differ in radio access technology (e.g. GSM and UMTS or UMTS and LTE) or the used frequency spectrum (e.g. the 900 MHz and 1800 MHz frequency bands)

In another embodiment, each of the first and second wireless access networks 2A, 2B is operated with a corresponding OMC (not shown in FIG. 2). The corresponding OMCs may be at least connected to one another in order to exchange information for generating a coverage assessment.

Further network elements may be arranged in the telecommunications infrastructure 200 of FIG. 2 between the one or more OMCs and the networks 2A and 2B of the corresponding wireless access technologies, as known to the person skilled in the art.

In the telecommunications infrastructure 200 of FIG. 2, a coverage assessment system, the operation of which will be further described with reference to FIG. 3, may be included within the one or more OMCs. However, the coverage assessment system is not necessarily implemented in such a centralized manner, but may also be decentralised by implementing coverage assessment functionality in other network elements (such as base stations) and using connections between these elements. Hybrid implementations are also envisaged. Signals for generating coverage assessment can be exchanged over management or traffic interfaces.

Figure 3:
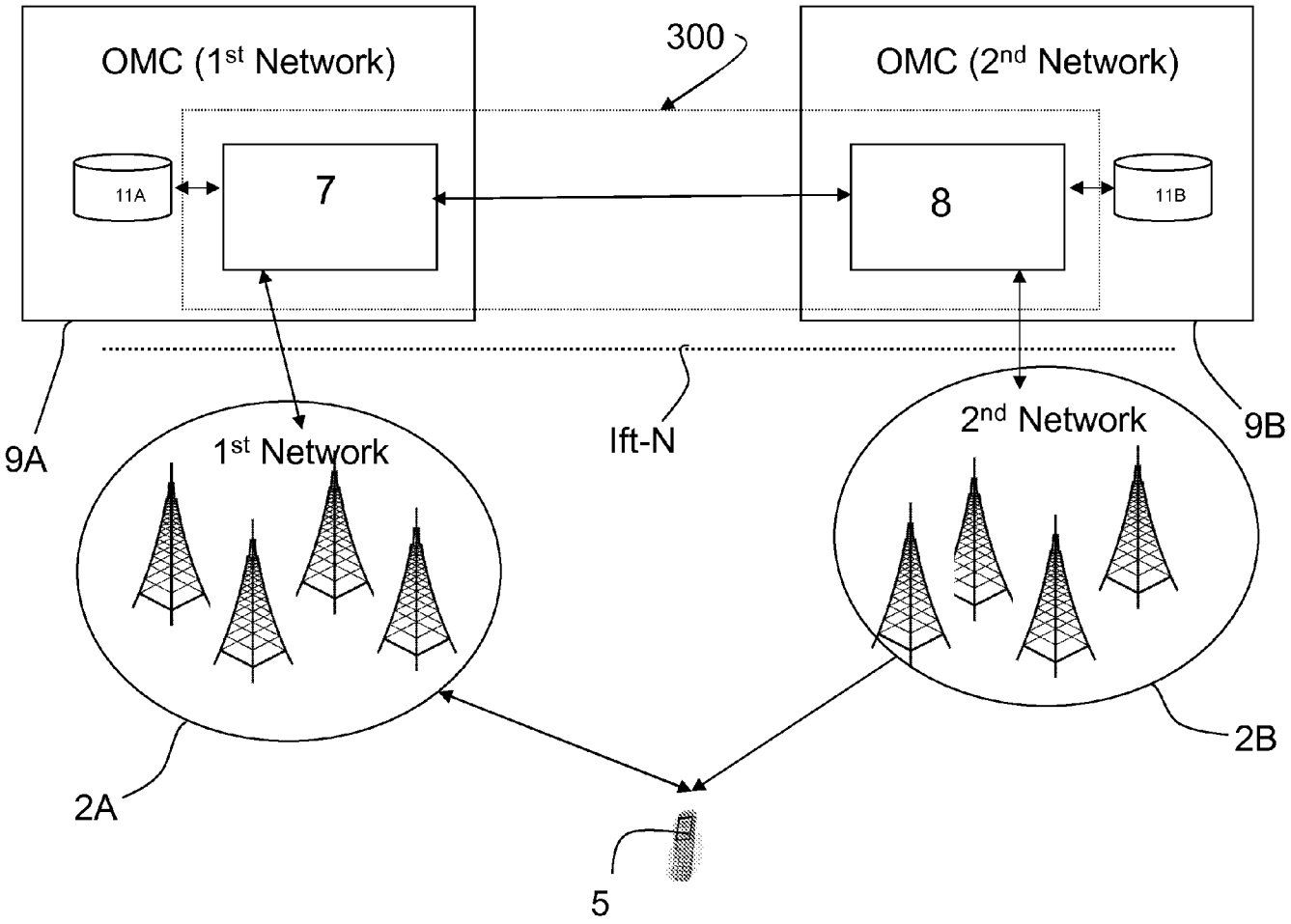
FIG. 3 illustrates an example of implementing a coverage assessment system, according to one embodiment of the present invention.

FIG. 3 illustrates an example of implementing a coverage assessment system 300, according to one embodiment of the present invention. As shown, the coverage assessment system 300 includes an information collector 7 and a coverage estimator 8. The information collector 7 is configured for collecting information from some of the terminals 5 via the first wireless access network 2A and providing the information to the coverage estimator 8. The coverage estimator 8 is configured for connecting to and receiving information from the information collector 7 and, based on the received information, generating the coverage assessment for the second wireless access network 2B.

In the embodiment shown in FIG. 3, the information collector 7 is included within an OMC 9A of the first wireless access network 2A and the coverage estimator 8 is included within an OMC 9B of the second wireless access network 2B. Alternatively, the first and second wireless access networks 2A, 2B may share the same OMC.

In one embodiment, the information collector 7 and the coverage estimator 8 may be largely implemented as software executed by a processor and making use of memory (not shown in FIG. 3). In other embodiments, the information collector 7 and the coverage estimator 8 may be implemented in hardware or in a combination of software and hardware.

Figure 4:
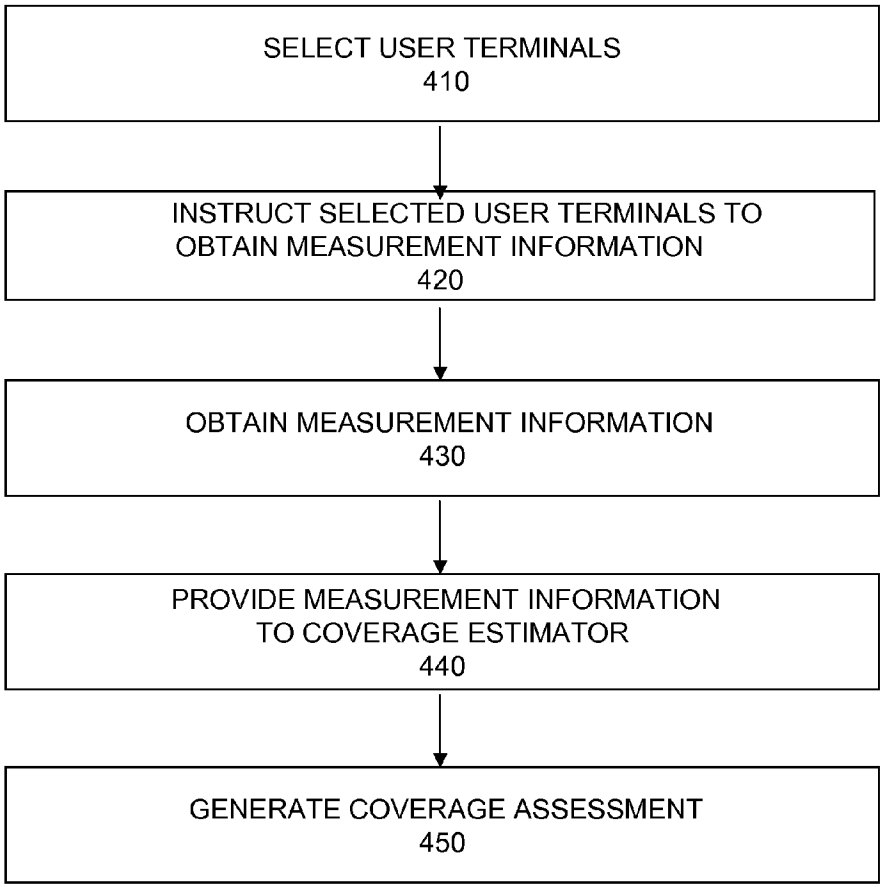
FIG. 4 provides a flow diagram of method steps for generating a coverage assessment for one wireless access network in a telecommunications infrastructure illustrated in FIG. 2, according to one embodiment of the present invention.

Optionally, the information collector 7 may be connected to a database 11A configured to store the location and measurement information (described in greater detail in FIG. 4). Also optionally, the coverage estimator 8 may be connected to a database 11B configured to store the results of coverage assessments for future use.

FIG. 4 provides a flow diagram of method steps for generating a coverage assessment for one wireless access network in a telecommunication infrastructure comprising two or more cooperating wireless access networks using the coverage assessment system 300, according to one embodiment of the present invention. While the method steps are described in conjunction with FIGS. 2 and 3, persons skilled in the art will recognize that any system configured to perform the method steps, in any order, is within the scope of the present invention. Furthermore, while the method is illustrated to include only two cooperating wireless access networks, the method is also applicable for any arbitrary number of cooperating wireless access networks.

In one embodiment of FIG. 4, consider that at a given location the first wireless access network 2A has a good radio coverage (and, therefore, the terminals 5 can connect to it) but there is no or poor radio coverage from the second wireless access network 2B. Further consider that the first wireless access network 2A is a 3G UMTS network, while the second wireless access network 2B is an LTE network. For an operator who already has an UMTS network, the UMTS network typically has a more extended coverage than the LTE network, especially at the beginning of the LTE deployment. As previously described, the terminals 5 are capable of communicating with both the first and second wireless access networks 2A, 2B.

The method for generating a coverage assessment may begin with an optional step (not shown in FIG. 4) where the information collector 7 requests, via the 3GPP Itf-N interface to the UMTS network (the first wireless access network 2A in this example), the location of all or a group of terminals 5 camping on or connected to the UMTS network. The UMTS network can either use its terminal positioning technologies specified in the 3GPP standard TS 25.305 to estimate the location of terminals, or ask the terminals via RRC signalling to provide the location information in case that the terminals are equipped with GPS.

Alternatively, the location information may be determined by the UMTS network (e.g., by the information collector 7 or some other module within the UMTS network) up to the cell level or group of cells (e.g., location/routing/tracking area level) by selecting the terminals in a specified geographical area. For example, some or all of the terminals 5 in a particular city area, a whole city, a district, a province, or a state may be selected for performing the measurements described below. Such an implementation may be advantageous when location estimation techniques are not available, when exact location information of the terminals 5 is not needed for selecting the terminals that should perform the measurements or when only coarse location information (e.g. cell-level location information) is sufficient.

In one embodiment, the coverage assessment system 300 may include a trigger for triggering the procedure of generating the coverage assessment, optionally including the step of obtaining the location information for the terminals 5 using any of the approaches discussed above. The trigger may be event-based (e.g. the instruction from the coverage estimator 8 to obtain measurement information) or periodical, with period T.

In step 410, the information collector 7 selects one or more of the terminals 5 for obtaining measurement information. This instruction may also be sent via the RRC signalling of the UMTS network. It should be noted that when the location information is obtained prior to step 410, then in step 410 only terminals located in the area for which the coverage assessment should be generated may be selected for obtaining the measurement information, thus avoiding collection of excessive measurement information.

The information collector 7 may also be configured to select the one or more of the terminals 5 according to one of the following alternative embodiments. In one embodiment, those terminals are selected that use a particular service via the UMTS network while, according to the operator policy, usage of that service is preferred via the LTE network. In another embodiment, a self-optimization or a manual optimization of a radio coverage may be performed for one or more base stations within the LTE network, and then the selected one or more terminals only comprise terminals in those cells within the UMTS network that have inter-RAT neighbour relation with cells of the LTE network where the optimization takes place. In yet another embodiment, the selected one or more terminals comprise terminals from one or more cells in the UMTS network where there is a planned coverage overlap with one or more cells in the second wireless access network 2B where the coverage should be assessed.

Persons skilled in the art will be able to complement the selection criteria described herein with additional selection criteria that may be relevant for the assessment of the coverage of the second wireless access network 2B.

The method then continues to step 420, where the information collector 7 instructs the selected one or more terminals, via the UMTS network, to measure signals from the LTE network. In step 430, the information collector 7 obtains measurement information indicative of the signals measured from the LTE network by the selected one or more terminals. The measurement information may e.g. include indications about cell identification, indications about signal strength, indications about system information provided by the measured cells, indications about timing, indications about the moment a measurement has been made, indications about the location or estimated location where a measurement has been made, etc. The measurement information relates at least to the LTE network and may additionally relate to measurements in the UMTS network, for example in order to obtain an LTE network signal strength measurement relative to a UMTS signal strength measurement and/or to use either information to perform, to support or to verify a location estimate. The measurement information may be sent via RRC signalling to the UMTS network and further via the Itf-N interface to the information collector 7.

Sometimes it may be possible that the location of the selected terminals when they actually perform the measurements is different from what it was when the initial location information was obtained in the optional step prior to step 410. This could happen when the selected terminals move during this period. Therefore, in one embodiment, the information collector 7 may be configured to update the location information for each of the selected one or more terminals with the location information valid when the measurement information was obtained from them. In case that the location information is provided by the terminal itself, the terminal may send the new location information along with the measurement results via e.g. RRC channel of the UMTS network. In case that the location of a particular selected terminal is estimated by the UMTS network, the UMTS network may re-estimate the location when it obtains the measurement results from that selected terminal. In any case, if the new location is different from the old one, the new location may be used by updating the old location information.

In another embodiment, the information collector 7 may be configured to update the location information for each of the selected one or more terminals after obtaining the measurement information from them. In such an embodiment, if the new location is different from the old one, an interpolation may be performed to estimate the measurement location from the old and the new locations.

Furthermore, if one of the selected terminals moved during the time period between obtaining the initial location information (in the optional step prior to step 410) and actually performing the measurements as instructed by the information collector 7, and the new location of such a terminal is out of the location area for which the coverage assessment should be generated, the new location and the corresponding measurement may be either discarded or stored in the database 11A for future use, but not used at the moment for the coverage assessment of the LTE network. In this case, the information collector 7 may be further configured to update the selected one or more terminals to eliminate terminals whose new location is not included in a predefined location area for which the coverage assessment should be generated.

The method then proceeds to step 440, where the information collector 7 forwards the measurement information obtained from the selected terminals to the coverage estimator 8 within the LTE network. If the information collector 7 also has the location information for the selected terminals, then the information collector 7 may associate the received measurement information with the location information prior to forwarding the measurement information and the location information to the coverage estimator 8.

The coverage estimator 8 is in charge of the coverage estimation of the LTE network (the second wireless access network 2B in this example), with the measurement information and, optionally, location information received from the information collector 7. Once the coverage estimator 8 obtains the measurement information (and, optionally, the location information) from the information collector 7, then, in step 450, the coverage estimator 8 generates the coverage assessment for the LTE network based on the information obtained from the information collector 7. The coverage assessment is generated by assembling a coverage map, representing the geographic locations/pixels with associated signal strengths of the LTE network. The coverage estimator 8 may also be configured to instruct the information collector 7 with some specifications for measurement, for example where to measure, when to measure, how often to measure or which particular LTE cells to measure.

The measured results and corresponding location information may be stored in the database 11A, and the estimated coverage results may be stored in the database 11B, for future use. The historical data in the database 11A may e.g. be used to make some statistical processing of the measured signal strengths in the same location/pixel or in a related set of locations/pixels. One example of such statistical processing is to determine an average or median value of the measured signal strengths in the considered location(s)/pixel(s) in order to mitigate the effect of fading of the LTE signal. Most advantageously, such statistical processing may determine an estimate of the degree of fading in the considered location(s)/pixel(s). It may determine, for example, an estimate for the standard deviation and/or an estimate of a low and high quantile value of the measured signal strengths in the considered location(s)/pixel(s). Also, the low quantile value may be used as an improved indicator of coverage in the considered location(s)/pixel(s) compared to an indicator based on an average or median value. Information about the severity of fading or information about a low quantile of the predicted signal strength is generally unavailable from coverage calculations based on models for the attenuation of radio signals. The historical data in the database 11B may e.g. be used to compare the coverage map before and after deploying new base stations of the LTE network, to confirm whether the coverage of the LTE network has improved or not in some specific areas.

With some modifications, persons skilled in the art could extend the deployment of the coverage assessment system to other architectures, networks, and selection criteria than those described in FIGS. 2-4.

Generating coverage assessment for one of the wireless access networks using results of the measurements collected at one of the other, cooperating, wireless access networks allows obtaining a more accurate and complete coverage assessment, relative to the prior art approaches. In addition, in contrast to the current coverage estimation methods, the proposed approach is able to account for the fact that a given wireless operator may operate multiple wireless access networks with non-identical coverage area (for example, one wireless access network may have an extensive, possibly near-complete, coverage area, while another wireless access network has a more limited, possibly discontinuous, coverage area).

Based on the generated coverage assessment, the coverage estimator 8 may further be configured to suggest geographical areas as candidates for coverage improvement.

One or more of thus suggested geographical areas may be selected as an input to a separate planning procedure. The coverage estimator 8 may even further be configured to indicate whether, e.g. based on an established rule-of-thumb, the suggested area for improvement is sufficiently close to an existing base station location to be served from there, or that a new base station location needs to be found and, possibly in addition, in which area such a base station location preferably could be found. The coverage estimator 8 may be also configured to compare the current coverage assessment with a previously generated coverage assessment to determine whether the coverage optimization actions in the past have led to a coverage improvement, identify where the coverage improvement is most pronounced, and identify the remaining areas where further coverage improvement is still needed. The system and method for coverage assessment as described here can also be advantageously used to measure interfering signals, e.g. those generated by the second wireless access network. The measured interference values may be taken into account for the coverage assessment or be valued as such and taken into account as input to a planning procedure.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

While the forgoing is directed to embodiments of the present invention, other and further embodiments of the invention may be devised without departing from the basic scope thereof Therefore, the scope of the present invention is determined by the claims that follow.

The invention claimed is:

1. An automatic coverage assessment system configured for generating a coverage assessment for a second wireless access network of a telecommunications infrastructure comprising a first wireless access network and the second wireless access network, the first and second wireless access networks capable of providing services to a plurality of terminals, the system comprising:

an information collector; and a coverage estimator, wherein the information collector is configured to:

(i) select one or more terminals from at least part of the plurality of the terminals, the at least part of the plurality of the terminals capable of communicating with both the first wireless access network and the second wireless access network, (ii) instruct the selected one or more terminals to measure signals from the second wireless access network, (iii) obtain measurement information indicative of the signals measured from the second wireless access network by the selected one or more terminals, and (iv) provide the measurement information to the coverage estimator, and wherein the coverage estimator is configured to:

(i) obtain the measurement information from the information collector, and (ii) based on the obtained measurement information, generate the coverage assessment for the second wireless access network of the telecommunications infrastructure.

2. The automatic coverage assessment system of claim 1, wherein the system further comprises a trigger configured for triggering the information collector to select the one or more terminals.

3. The automatic coverage assessment system of claim 1, wherein the information collector is further configured to obtain location information for at least one of the at least part of the plurality of terminals prior to selecting the one or more terminals.

4. The automatic coverage assessment system of claim 3, wherein the information collector is further configured to associate the location information with at least one of the selected one or more terminals and provide the location information associated with the at least one of the selected one or more terminals to the coverage estimator.

5. The automatic coverage assessment system of claim 1, wherein the information collector is further configured to provide location information valid upon obtaining the measurement information for at least one of the selected one or more terminals.

6. An automatic coverage assessment method for generating a coverage assessment for a second wireless access network of a telecommunications infrastructure comprising a first wireless access network and the second wireless access network, the first and second wireless access networks capable of providing services to a plurality of terminals, the method comprising:

(i) collecting, at an information collector, information from terminals by:

selecting one or more terminals from at least part of the plurality of the terminals, the at least part of the plurality of the terminals capable of communicating with both the first wireless access network and the second wireless access network, instructing the selected one or more terminals to measure signals from the second wireless access network, obtaining measurement information indicative of the signals measured from the second wireless access network by the selected one or more terminals, and providing the measurement information to a coverage estimator; and (ii) generating, at the coverage estimator, the coverage assessment for the second wireless access network by:

obtaining the measurement information from the information collector, and based on the obtained measurement information, generating the coverage assessment for the second wireless access network of the telecommunications infrastructure.

7. The automatic coverage assessment method of claim 6, further comprising the step of triggering the information collector to select the one or more terminals.

8. The automatic coverage assessment method of claim 6, further comprising the step of obtaining location information for at least one of the at least part of the plurality of terminals prior to selecting the one or more terminals.

9. The automatic coverage assessment method of claim 8, further comprising the step of providing the location information valid upon obtaining the measurement information for at least one of the selected one or more terminals.

10. The automatic coverage assessment method of claim 8, further comprising:

associating the location information with at least one of the selected one or more terminals, and forwarding the location information associated with the at least one of the selected one or more terminals to the coverage estimator.

11. A mobile user terminal configured for use in [the method of claim 6] *an automatic coverage assessment method for generating a coverage assessment for a second wireless access network of a telecommunications infrastructure, the telecommunications infrastructure comprising a first wireless access network and the second wireless access network, wherein the first and second wireless access networks are capable of providing services to a plurality of terminals, and wherein* the *mobile user* terminal [comprising] *comprises*:

means for measuring signals from the second wireless access network; and means for providing the measurement information to at least one of [the] *an* information collector [and the] *or a* coverage estimator based on the measured signals,

*wherein the mobile user terminal is further configured to:*

*receive an instruction from the information collector to measure signals,*

*wherein the information collector carries out operations including collecting information from terminals by:*

*selecting one or more terminals from at least part of the plurality of the terminals, the at least part of the plurality of the terminals capable of communicating with both the first wireless access network and the second wireless access network,*

*instructing the selected one or more terminals to measure signals from the second wireless access network,*

*obtaining measurement information indicative of the signals measured from the second wireless access network by the selected one or more terminals, and*

*providing the measurement information to a coverage estimator;*

*and*

*measure signals from the second wireless access network;*

*wherein the coverage estimator carries out operations including generating the coverage assessment for the second wireless access network by:*

*obtaining the measurement information from the information collector, and*

*based on the obtained measurement information, generating the coverage assessment for the second wireless access network of the telecommunications infrastructure.*

12. A [computer program comprising software code portions configured for,] *non-transitory computer-readable medium having instructions stored thereon that,* when executed by a processor *of a telecommunications infrastructure comprising a first wireless access network and the second wireless access network, the first and second wireless access networks capable of providing services to a plurality of terminals, causes the telecommunications infrastructure to carry out operations of an automatic coverage assessment method for generating a coverage assessment for the second wireless access network, the operations including:* [, performing one or more steps of the method of claim 6]

*(i) collecting, at an information collector, information from terminals by:*

*selecting one or more terminals from at least part of the plurality of the terminals, the at least part of the plurality of the terminals capable of communicating with both the first wireless access network and the second wireless access network,*

*instructing the selected one or more terminals to measure signals from the second wireless access network,*

*obtaining measurement information indicative of the signals measured from the second wireless access network by the selected one or more terminals, and*

*providing the measurement information to a coverage estimator; and*

*(ii) generating, at the coverage estimator, the coverage assessment for the second wireless access network by:*

*obtaining the measurement information from the information collector, and*

*based on the obtained measurement information, generating the coverage assessment for the second wireless access network of the telecommunications infrastructure.*

13. A network node for use in a telecommunications infrastructure comprising a first wireless access network and a second wireless access network, the first and second wireless access networks capable of providing services to a plurality of terminals, the node comprising:

means for selecting one or more terminals from at least part of the plurality of the terminals, the at least part of the plurality of the terminals capable of communicating with both the first wireless access network and the second wireless access network;

means for instructing the selected one or more terminals to measure signals from the second wireless access network, means for obtaining measurement information indicative of the signals measured from the second wireless access network by the selected one or more terminals; and means for providing the measurement information to a coverage estimator, wherein the coverage estimator is configured to generate the coverage assessment for the second wireless access network of the telecommunications infrastructure based on the measurement information provided by the network node.

14. The network node of claim 13, wherein the coverage estimator is included within the network node.

15. A network node for use in a telecommunications infrastructure comprising a first wireless access network and a second wireless access network, the first and second wireless access networks capable of providing services to a plurality of terminals, the node comprising:

means for obtaining measurement information from an information collector; and means for generating the coverage assessment for the second wireless access network of the telecommunications infrastructure based on the obtained measurement information, wherein the information collector is configured to:

(i) select one or more terminals from at least part of the plurality of the terminals, the at least part of the plurality of the terminals capable of communicating with both the first wireless access network and the second wireless access network, (ii) instruct the selected one or more terminals to measure signals from the second wireless access network, (iii) obtain measurement information indicative of the signals measured from the second wireless access network by the selected one or more terminals, and (iv) provide the measurement information to the network node.

* * * * *